(12) United States Patent
Wang et al.

(10) Patent No.: US 12,345,830 B2
(45) Date of Patent: Jul. 1, 2025

(54) ASSET-TRACKING SYSTEM

(71) Applicant: SIGNIFY HOLDING B.V., Eindhoven (NL)

(72) Inventors: Xiangyu Wang, Eindhoven (NL); Octavio Alejandro Santana Arnaiz, Eindhoven (NL); Armand Michel Marie Lelkens, Heerlen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 348 days.

(21) Appl. No.: 18/017,145

(22) PCT Filed: Jul. 13, 2021

(86) PCT No.: PCT/EP2021/069407
§ 371 (c)(1),
(2) Date: Jan. 20, 2023

(87) PCT Pub. No.: WO2022/017862
PCT Pub. Date: Jan. 27, 2022

(65) Prior Publication Data
US 2023/0266433 A1    Aug. 24, 2023

(30) Foreign Application Priority Data

Jul. 23, 2020 (EP) .................................. 20187295

(51) Int. Cl.
*G01S 5/14* (2006.01)
(52) U.S. Cl.
CPC ............. *G01S 5/14* (2013.01); *G01S 2205/01* (2020.05)
(58) Field of Classification Search
CPC ................................ G01S 5/14; G01S 2205/01
(Continued)

(56) References Cited

U.S. PATENT DOCUMENTS 10,129,700 B2   11/2018  Singamsetty et al.
2003/0235172 A1  12/2003  Wood
(Continued)

FOREIGN PATENT DOCUMENTS

CN    110246155 A  *  9/2019  ............. G06T 7/251
JP    2019192132 A    10/2019
(Continued)

OTHER PUBLICATIONS

Kim, Hyunsoo, et al., "Accuracy Improvement of Real-Time Location Tracking for Construction Workers," Sustainability, MDPI, Published May 2018 (16 Pages).

*Primary Examiner* — Harry K Liu

(57) ABSTRACT

The invention provides an asset-tracking system (100) for tracking a target tag (10) in a space (500), wherein the target tag (10) is configured to emit a target beacon signal, wherein the asset-tracking system (100) comprises a plurality of listener nodes (110) arranged in the space (500) and configured to detect the target beacon signal, wherein the asset-tracking system (100) comprises a control system (300), wherein the control system (300) has access to (i) listener location data and to (ii) map data, wherein in an operational mode: the control system (300) determines the presence of an object (200), wherein an object tag (210) is associated to the object (200), and wherein the object tag (210) is configured to emit an object beacon signal, wherein the plurality of listener nodes (110) are configured to detect the object beacon signal and to provide a related object signal to the control system (300); the control system (300) determines a confidence zone set (230) for each listener node (110) based on the related object signal, the listener location data and the map data; the plurality of listener nodes (110) detect the target beacon signal and provide a related target signal to the control system (300); and the control system (300) determines a target tag location of the target
(Continued)

tag (10) based on the related target signal, the listener location data, the map data, and the confidence zone sets (230) of the plurality of listener nodes (110).

14 Claims, 3 Drawing Sheets

(58) Field of Classification Search
USPC .......................................................... 342/458
See application file for complete search history.

(56) References Cited

U.S. PATENT DOCUMENTS

| | | |
|---|---|---|
| 2009/0189767 A1 | 7/2009 | Primm et al. |
| 2010/0158331 A1 | 6/2010 | Jacobs et al. |
| 2013/0299440 A1 | 11/2013 | Hermann et al. |
| 2014/0350725 A1 | 11/2014 | LaFary et al. |
| 2021/0092616 A1* | 3/2021 | Desai .................. H04B 17/364 |

FOREIGN PATENT DOCUMENTS

| | | | |
|---|---|---|---|
| JP | 2020098530 A | 6/2020 | |
| WO | WO-2021134285 A1 * | 7/2021 | |
| WO | WO-2022015873 A2 * | 1/2022 | ............. G01S 19/06 |

\* cited by examiner

ASSET-TRACKING SYSTEM

CROSS-REFERENCE TO PRIOR APPLICATIONS

This application is the U.S. National Phase application under 35 U.S.C. § 371 of International Application No. PCT/EP2021/069407, filed on Jul. 13, 2021, which claims the benefit of European Patent Application No. 20187295.9, filed on Jul. 23, 2020. These applications are hereby incorporated by reference herein.

FIELD OF THE INVENTION

The invention relates to an asset-tracking system. The invention further relates to a method for localizing an emission location of a beacon signal, more specifically a method for tracking a target tag in a space.

BACKGROUND OF THE INVENTION

Asset-tracking systems are known in the art. For instance, Kim et al., "Accuracy Improvement of Real-Time Location Tracking for Construction Workers" describes a real-time locating system using radio frequency identification (RFID). It describes a location tracking error mitigation algorithm and the use of assistant tags.

SUMMARY OF THE INVENTION

Asset tracking systems may typically comprise three types of field devices: (mobile) tags, listener nodes (or "anchors"), and gateways. In such a system, the tags may emit beacon signals, and the listener nodes may detect incoming beacon signals sent by tags and conduct measurements such as signal strength measurements. Measurements may typically be conducted by multiple listener nodes and the listener nodes may send those results to a gateway from where they may be further processed, such as by further forwarding them to a positioning engine on a server or in the cloud.

The listener nodes may be spatially distributed throughout a space in which the tag is to be tracked to provide good coverage of the space, and the tag may then be located based on signals from multiple listener nodes. For example, the position engine may estimate that the tag is closest to the listener node that recorded the highest signal strength with regards to the beacon signal.

Prior art methods may, however, suffer from individual listener nodes becoming temporarily (or essentially permanently) obstructed, for example due to a (large) object being arranged in the space, such as in a factory hall or in a mall. The object may interfere with the detection of the beacon signal by the listener node. Regardless, the listener node may still detect the beacon signal, which may ultimately have a net negative result on the positioning of the tag by the positioning engine. For example, the tag could be very close to a listener node, but as the direct line-of-sight (LOS) between the listener node and the tag is blocked, the listener node may detect a relatively weak signal. Based on the weak signal, the positioning engine may estimate the tag to be located remotely from the listener node.

Hence, it is an aspect of the invention to provide an alternative asset-tracking system, which preferably further at least partly obviates one or more of above-described drawbacks. The present invention may have as object to overcome or ameliorate at least one of the disadvantages of the prior art, or to provide a useful alternative.

Hence, the present invention is defined by the appended independent claims and the corresponding dependent claims.

Hence, in a first aspect, the invention may provide an asset-tracking system for tracking a (mobile) target tag, especially in a space. The asset-tracking system may comprise a plurality of listener nodes arranged in the space. The asset-tracking system may further comprise a control system. In embodiments, the control system may have access to listener location data, especially listener location data of the plurality of listener nodes. In further embodiments, the control system may have access to map data, especially map data of the space. The asset-tracking system may further have (or "be operated in") an operational mode. The operational mode may comprise one or more of an object detection stage, a confidence zone determination stage, a tag detection stage, and a tag localization stage.

In the object detection stage, the control system may (be configured to) determine the presence of an object (in the space), especially wherein an object tag is associated to the object. The object tag and (at least part of the total number of) the plurality of listener nodes may (be configured to) communicate via an object communication signal and to provide a related object signal to the control system.

In the confidence zone determination stage, the control system may (be configured to) determine a (object-related) (detection) confidence zone set for each listener node based on one or more of the related object signal, the listener location data and the map data, especially based on the related object signal, the listener location data and the map data, In the tag detection stage, the target tag and (at least part of the total number of) the plurality of listener nodes may (be configured to) communicate via a target communication signal and to provide a related target signal (also: "(related) location signal" or "(related) tracking signal") to the control system.

In the tag localization stage, the control system may (be configured to) determine a target tag location (estimate) of the target tag based on one or more of the related target signal, the listener location data, the map data, and the confidence zone sets of (the at least part of the total number of) the plurality of listener nodes, especially based on the related target signal, the listener location data, the map data, and the confidence zone sets.

In specific embodiments, the invention provides an asset-tracking system for tracking a target tag in a space, wherein the asset-tracking system comprises a plurality of listener nodes arranged in the space, and wherein the asset-tracking system comprises a control system, wherein the control system has access to (i) listener location data and to (ii) map data, wherein in an operational mode: the control system (is configured to) determines the presence of an object, wherein an object tag is associated to the object, and wherein the object tag and the plurality of listener nodes are configured to communicate via an object communication signal and to provide a related object signal to the control system; the control system (is configured to) determines a confidence zone set for each listener node based on the related object signal, the listener location data and the map data; the target tag and the plurality of listener nodes are configured to communicate via an target communication signal and to provide a related target signal to the control system; and the control system (is configured to) determines a target tag location of the target tag based on the related target signal, the listener location data, the map data, and the confidence zone sets of the plurality of listener nodes.

The asset-tracking system of the invention may provide the benefit that the object (also: "obstacle") is accounted for by the control system when determining the target tag location. Thereby, the target tag location may be determined more accurately when objects are moving through the space and/or when objects are (temporarily) arranged in the space and thereby interfering with the communication between the listener nodes and the target tag, especially the detection of a target beacon signal by the listener nodes (see below), for example by obstructing the field of view of the listener node.

In particular, the object may be tagged with an object tag, allowing the asset-tracking system to (directly) track the object. Based on the communication between the object tag and the listener nodes, especially the detection of an object beacon signal by the listener nodes, the control system may (be configured to) estimate confidence zones for each listener node, e.g., the control system may (be configured to) determine that due to an object partially obstructing a communication path, especially a field of view, for a listener node, the listener node may have reduced suitability for tracking the target tag in a first part of the space (a low confidence zone), while remaining suitable for communicating with, especially detecting, the target tag in a second part of the space (a high confidence zone). If the object is moved, the asset-tracking system may (dynamically) update the confidence zones for each listener node, thereby facilitating maintaining accurate localization in a space with a (large) moving object.

In particular, the invention may enable accounting for a (moving) object in a space, wherein the object may interfere with the communication between a target tag and a listener node, especially with the detection of a target beacon signal by a listener node, to accurately locate a target tag in the space.

Hence, in a first step an object (or "obstacle") may be automatically located and dimensioned by using the same tracking system infrastructure as for an asset-tracking system. The automatic positioning and dimension can be done even when the object, such as an overhead crane, is in motion. In a second step, the position and dimension of the obstacle may be used to calculate the blocked line-of-sight area with respect to every listener node in the neighborhood. In a third step, when a target tag is moving to or is already within the blocked area, the positioning engine that is used to calculate the position of the target tag may exclude data from the listener node that is associated to the blocked area.

In further embodiments, the target tag may (be configured to) emit a target beacon signal, especially to periodically emit a target beacon signal. Especially, the plurality of listener nodes may be configured to detect the target beacon signal and to provide the related target signal to the control system. Hence, the target communication signal may be the target beacon signal.

In further embodiments, the object tag may (be configured to) emit an object beacon signal, especially to periodically emit an object beacon signal. In further embodiments, the object beacon signal may especially comprise an object identification signal. In further embodiments, the plurality of listener nodes may be configured to detect the object beacon signal and to provide the related object signal to the control system. Hence, the object communication signal may be the object beacon signal.

Embodiments wherein both the target tag and the object tag emit respective beacon signals may be particularly advantageous as the tags are only active for a short time period to emit a beacon signal, whereas the tags may be active for longer time periods, especially continuously, if the tags are to detect a communication from the listener nodes. Hence, embodiments wherein the tags emit beacon signal may be more efficient with regards to battery life of the tags.

Hence, in specific embodiments, the invention may provide an asset-tracking system for tracking a target tag in a space, wherein the target tag periodically emits a target beacon signal, wherein the asset-tracking system comprises a plurality of listener nodes arranged in the space and configured to detect the target beacon signal, wherein the asset-tracking system comprises a control system, wherein the control system has access to (i) listener location data and to (ii) map data, wherein in an operational mode: (a) the control system (is configured to) determines the presence of an object, wherein an object tag is associated to the object, and wherein the object tag is configured to emit an object beacon signal, wherein the plurality of listener nodes are configured to detect the object beacon signal and to provide a related object signal to the control system; (b) the control system (is configured to) determines a confidence zone set for each listener node based on the related object signal, the listener location data and the map data; (c) the plurality of listener nodes (are configured to) detect the target beacon signal and provide a related target signal to the control system; and (d) the control system (is configured to) determines a target tag location of the target tag based on the related target signal, the listener location data, the map data, and the confidence zone sets of the plurality of listener nodes.

Hence, in embodiments, the tags may emit respective beacon signals, which may be detected (or: "received") by the listener nodes, and the listener nodes may provide a related signal to the control system, i.e., the target communication signal may be the target beacon signal and the object communication signal may be the object beacon signal. Such embodiments may, in general, be preferable in view of battery life of the tags (in comparison to embodiments wherein the listener nodes emit signals detected by the tags).

In further embodiments, the plurality of listener nodes may (be configured to) emit a listener node signal, especially to periodically emit a listener node signal. In particular, each listener node of the plurality of listener nodes may emit a (respective) listener node signal. Especially, the target tag may be configured to detect the listener node signal from (at least part of) the plurality of listener nodes and to provide the related target signal to the control system. Hence, the target communication signal may be the listener node signal.

In further embodiments, the plurality of listener nodes may (be configured to) emit a listener node signal, especially to periodically emit a listener node signal. Especially, the target tag may be configured to detect the listener node signal from (at least part of) the plurality of listener nodes and to provide the related target signal to the control system. Hence, the target communication signal may be the listener node signal.

In general, either both the target tag and the object tag may (be configured to) emit beacon signal or both may be configured to detect the listener node signal. However, mixed embodiments are also possible.

The invention will hereinafter, for explanatory purposes, primarily be described in the context of embodiments wherein both tags are configured to emit beacon signals. It will be clear to the person skilled in the art that the invention is not limited to such embodiments.

Hence, the invention may provide an asset-tracking system for tracking a target tag in a space. The term "asset-tracking system" may refer to any system configured to track the location and/or movement of one or more target tags, within a space, especially within a (defined) space.

The term "target tag" (also "tag") may herein refer to an item that may be tracked, especially a uniquely identifiable item, such as by being provided with a target tag identification. The target tag may especially be connected to a (larger) item that is desired to be tracked, such as attached to an item, or such as worn by a person. For example, the target tag may comprise one or more of a sticker, a badge, a wristband, and a token. Further, the target tag may be configured to emit a wireless signal, such as a radio beacon, or such as a Bluetooth low energy beacon.

In general, the target tag may be a mobile target tag.

The term "space" may herein refer to any space in which it may be desirable to track the whereabouts of the target tag. The space may especially comprise a (part of) a building, such as (part of) a shopping mall, a factory or a hospital. The space may, however, also be located outside. The space may, for example, comprise a recreational park or a farm. In embodiments, the term "space" may refer to an office, a shop, a warehouse, a theater, a hospitality area, a hospital, an elderly home, a hotel, a plant, an airport, a shopping mall, a factory, a horticulture plant. The term space may refer to an indoor space or an outdoor space, especially an indoor space. As will be clear to the person skilled in the art, in general, the space is not comprised by the asset-tracking system, i.e., the space is not part of the system.

The object tag and the plurality of listener nodes may be configured to (wirelessly) communicate via an object communication signal. In embodiments, the object communication signal may comprise an object beacon signal, wherein the object tag is configured to emit the object beacon signal and wherein the plurality of listener nodes are configured to detect the object beacon signal. In further embodiments, the object communication signal may comprise a listener node signal, wherein the plurality of listener nodes are configured to emit the listener node signal and wherein the object tag is configured to detect (or "receive") the listener node signal. In particular, the element receiving the object communication signal, e.g., the plurality of listener nodes in the case of the object beacon signal, may provide a related object signal to the control system.

The target tag and the plurality of listener nodes may be configured to (wirelessly) communicate via a target communication signal. In embodiments, the target communication signal may comprise a target beacon signal, wherein the target tag is configured to emit the target beacon signal and wherein the plurality of listener nodes (are configured to) detect the target beacon signal. In further embodiments, the target communication signal may comprise a listener node signal, wherein the plurality of listener nodes are configured to emit the listener node signal and wherein the target tag is configured to detect (or "receive") the listener node signal. In particular, the element receiving the target communication signal, e.g., the plurality of listener nodes in the case of the target beacon signal, may provide a related target signal to the control system.

In embodiments, the target tag may be configured to emit a target beacon signal (or: "beacon signal").

In embodiments, the target tag may (be configured to) periodically emit a target beacon signal. In further embodiments, the target tag may emit a target beacon signal according to a regular period, such as every 15 minutes. However, in further embodiments, the target tag may emit the target beacon signal according to an irregular period, such as a period varying over the time of day, or whenever an external signal is received, or whenever the target tag is moved. For example, the target tag may comprise a (passive) RFID tag and may emit the target beacon signal upon receiving a (suitable) radio wave.

In further embodiments, the target tag may (be configured to) (essentially) continuously emit a target beacon signal.

The target beacon signal may comprise any type of signal that may be detectable by the plurality of listener nodes. In embodiments, the beacon signal may, for example, comprise a wireless communication signal, such as a wireless communication signal selected from the group comprising Bluetooth signals, ZigBee (beacon packet) signals, Wi-Fi (beacon packet) signals, Li-Fi (beacon packet) signals, ultra-wideband packet signals, and thread signals. In embodiments, the target beacon signal may comprise one or more carrier frequencies, especially a plurality of carrier frequencies.

The target beacon signal may especially comprise a target tag identification code. The target tag identification code may be specific for the target tag, and may especially be suitable to uniquely identify the target tag. Thereby, different target tags may be distinguished, and different (tagged) items may be (independently) tracked.

The target beacon signal may also comprise a target beacon signal sequence number. The target beacon signal sequence number may be specific for the target tag in a given time, and may be increased sequentially until it reaches the maximum number allowed before it wraps back to the minimum number allowed. Thereby, different target beacon signals may be distinguished, and different target beacon signals from the target tag may be uniquely identified, by e.g. the listeners, within a short period of time, within which it is known to be impossible to have more than one target beacon signal from the target tag with identical sequence numbers.

The asset-tracking system may comprise a plurality of listener nodes. A listener node may in the art generally also be referred to as "tag listener", "tag locator", "anchor node", "tag scanner", "reference node", and "sniffer". In embodiments, the listener nodes may be configured to detect (or: "receive") the target beacon signal, i.e., the listener nodes may be capable of detecting the target beacon signal. The listener nodes may especially be passively detecting the target beacon signal. In further embodiments, the listener nodes may comprise antenna configured for detecting (or: "receiving") the target beacon signal.

The listener nodes may especially be arranged in the space, i.e., in the space in which a target tag is to be tracked. It will be clear to the person skilled in the art that the listener nodes may be arranged in locations the target tag generally does not reach, e.g., the target tag may be used to track a person in an office building, and the listener nodes may be arranged in the lighting system of the office building.

Hence, the invention also provides a lighting system comprising a plurality of lighting devices, wherein two or more lighting devices, especially at least 6, such as at least 8, like at least 12, even more especially at least 20, lighting devices comprise respective listener nodes, for use in the herein described asset-tracking system. Yet, in a further aspect the invention also provides a lighting system comprising the herein described asset-tracking system.

In embodiments, the plurality of listener nodes may be configured to emit a listener node signal (or: "listener signal").

In embodiments, (at least part of) the plurality of listener nodes may (be configured to) periodically emit a listener node signal. In particular, each of the (at least part of the) plurality of listener nodes may (be configured to) periodically emit a (respective) listener node signal. In further embodiments, the plurality of listener nodes may emit a listener node signal according to a regular period, such as every 15 minutes. However, in further embodiments, the plurality of listener nodes may emit the listener node signal according to an irregular period, such as a period varying over the time of day, or whenever an external signal is received. For example, the plurality of listener nodes may comprise (passive) RFID tags and may emit the listener node signal upon receiving a (suitable) radio wave.

In further embodiments, the plurality of listener nodes may (be configured to) (essentially) continuously emit a listener node signal.

The listener node signal may comprise any type of signal that may be detectable by the target tag and/or the object tag. In embodiments, the listener node signal may, for example, comprise a wireless communication signal, such as a wireless communication signal selected from the group comprising Bluetooth signals, ZigBee (beacon packet) signals, Wi-Fi (beacon packet) signals, Li-Fi (beacon packet) signals, ultra-wideband packet signals, and thread signals. In embodiments, the listener node signal may comprise one or more carrier frequencies, especially a plurality of carrier frequencies.

For each listener node, the (respective) listener node signal may especially comprise a listener node identification code. The listener node identification code may be specific for the listener node, and may especially be suitable to uniquely identify the listener node. Thereby, different listener nodes may be distinguished.

The listener node signal may also comprise a listener node signal sequence number. The listener node signal sequence number may be specific for the plurality of listener nodes in a given time, and may be increased sequentially until it reaches the maximum number allowed before it wraps back to the minimum number allowed. Thereby, different listener node signals may be distinguished, and different listener node signal from the plurality of listener nodes may be uniquely identified, by e.g. the target tag and/or the object tag, within a short period of time, within which it is known to be impossible for the plurality of listener nodes to emit a listener node signal with the same listener node signal sequence number.

In embodiments, the target tag may be configured to detect the listener node signal.

In further embodiments, the object tag may be configured to detect the listener node signal.

In embodiments, the asset-tracking system may further comprise a control system. The control system may especially be configured to control the asset-tracking system, especially the plurality of listener nodes.

In embodiments, the control system may have access to listener location data (also: "location data"), especially listener location data of the plurality of the plurality of listener nodes. The listener location data may especially comprise data on the locations of (each of) the plurality of listener nodes in the space, such as data regarding the rooms of (each of) the plurality of listener nodes, and/or such as coordinates of (each of) the plurality of listener nodes.

In further embodiments, the control system may have access to map data, especially map data of the space. The map data may especially comprise a lay-out of the space, such as, with respect to a building, data regarding rooms and/or walls and/or floors, and/or such as, with respect to an outside area, data regarding elevation, trees, buildings, et cetera.

In further embodiments, the control system may comprise a gateway, especially wherein the listener nodes are in a (wireless) communication relationship with the gateway.

In further embodiments, the control system may comprise a positioning engine, especially wherein the positioning engine is configured to determine a location of a tag based on data related to the detection of a beacon signal emitted by the tag from one or more listener nodes, especially from a plurality of listener nodes.

The asset-tracking system, especially the control system, may have an operational mode. The term "operational mode" may also be indicated as "controlling mode". The system, or apparatus, or device (see further also below) may execute an action in a "mode" or "operational mode" or "mode of operation". Likewise, in a method an action, stage, or step may be executed in a "mode" or "operation mode" or "mode of operation". This does not exclude that the system, or apparatus, or device may also be adapted for providing another controlling mode, or a plurality of other controlling modes. Likewise, this does not exclude that before executing the mode and/or after executing the mode one or more other modes may be executed. However, in embodiments a control system (see further also below) may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

The operational mode may comprise an object detection stage, a confidence zone determination stage, a tag detection stage, and a tag localization stage.

In embodiments, in the detection stage, the control system may (be configured to) determine the presence of an object, especially the presence of the object in the space. The term "object" may herein refer to anything may interfere with the detection of a target beacon signal by a listener node, such as by blocking the line of sight of the listener node. In particular, the object may, for example, be a machine, such as a crane, an information stand, or an art installation. The term "object" may herein also refer to a plurality of objects.

In embodiments, the object may be associated to an object tag. In further embodiments, the object tag may be configured to emit an object beacon signal.

In embodiments, the object tag may (be configured to) periodically emit an object beacon signal. In further embodiments, the object tag may emit an object beacon signal according to a regular period, such as every 15 minutes. However, in further embodiments, the object tag may emit the object beacon signal according to an irregular period, such as a period varying over the time of day, or whenever an external signal is received, or whenever the object tag is moved. For example, the object tag may comprise a (passive) RFID tag and may emit the object beacon signal upon receiving a (suitable) radio wave.

In further embodiments, the object tag may (be configured to) (essentially) continuously emit an object beacon signal.

The target beacon signal may comprise any type of signal that may be detectable by the plurality of listener nodes. In embodiments, the beacon signal may, for example, comprise a wireless communication signal, such as a wireless communication signal selected from the group comprising Bluetooth signals, ZigBee (beacon packet) signals, Li-Fi (beacon packet) signals, Wi-Fi (beacon packet) signals, ultra-wideband packet signals, and thread signals. In embodiments, the object beacon signal may comprise one or more carrier frequencies, especially a plurality of carrier frequencies.

In embodiments, the object tag may be arranged on the object, especially arranged on the object at an accessible location, i.e., a location that may generally be accessible for detection by a listener node, such as a location that may be relatively unobstructed for the plurality of listener nodes. For example, the object tag may be arranged at a top corner of the object. The term "object tag" may herein also refer to a plurality of object tags. In particular, for large objects it may be beneficial to provide a plurality of object tags (at well-defined sites), such that the location and orientation of the object can be accurately determined (by the control system).

The object beacon signal may especially comprise an object tag identification code. The object tag identification code may be specific for the object tag, and may especially be suitable to uniquely identify the object tag, and especially the object. Thereby, different object tags may be distinguished, and different (tagged) objects may be (independently) tracked.

The object beacon signal may also comprise an object beacon signal sequence number. The object beacon signal sequence number may be specific for the object tag in a given time, and may be increased sequentially until it reaches the maximum number allowed before it wraps back to the minimum number allowed. Thereby, different object beacon signals may be distinguished, and different object beacon signals from the object tag may be uniquely identified, by e.g. the listeners, within a short period of time, within which it is known to be impossible to have more than one object beacon signal from the object tag with identical sequence numbers.

In embodiments, the plurality of listener nodes may be configured to detect (or "receive") the object beacon signal, and especially to provide a related object signal to the control system. Hence, the listener nodes may be capable of detecting the object beacon signal. The listener nodes may especially be passively detecting the object beacon signal. In further embodiments, the listener nodes may comprise antenna configured for detecting (or: "receiving") the object beacon signal.

The term "related" in "related object signal" may herein refer to the object signal being related to the object beacon signal, such as at least partially being based on the (detection of) the object beacon signal.

Hence, the plurality of listener nodes may (passively) detect an object beacon signal and provide a related object signal to the control system. The control system may (be configured to) determine whether an object is present (in the space) based on the related object signal.

For example, the plurality of listener nodes may detect no object beacon signal (or: "the absence of an object beacon signal") and provide a related object signal to the control system. On the basis of the related object signal, the control system may (be configured to) then determine that the object is absent from the space. In such scenario, the related object signal could, for example, be a dedicated related object signal to indicate the absence of detection of an object beacon signal, but it could also be the absence of an actual signal being sent to the control system, i.e., the plurality of listener nodes may be configured only to provide a related object signal if an object is detected.

In the confidence zone determination stage, the control system may (be configured to) determine a confidence zone set for each listener node based on one or more of the related object signal, the listener location data and the map data, especially based on the related object signal, the listener location data and the map data.

The term "confidence zone set" may herein refer to a set of one or more confidence zones for a specific listener node. Hence, each confidence zone set may comprise one or more confidence zones. In particular, the control system may, for each listener node of the plurality of listener nodes, (be configured to) divide the space into one or more confidence zones based on the related object signal, the listener location data and the map data. For example, for a specific listener node, the space may be divided into a low confidence zone, a medium confidence zone, and a high confidence zone, wherein the "view" of the listener node in the low confidence zone is fully obstructed, wherein the view of the listener node in the medium confidence zone is partially obstructed and/or wherein it is uncertain whether the view of the listener node in the medium confidence zone is obstructed, and wherein the view of the listener node in the high confidence zone is unobstructed.

In general, in embodiments, the confidence zone set may especially be an object-related confidence zone set.

In embodiments, the confidence zone may be a confidence area and/or a confidence volume (or: "confidence space").

In further embodiments, the confidence zone may be a confidence area, i.e., the confidence zone may (essentially) be 2D. The use of confidence areas may be beneficial as determining confidence areas may be computationally less demanding than determining a confidence volume, which may, for example, facilitate localizing the tag more quickly.

In further embodiments, the confidence zone may be a confidence volume, i.e., the confidence zone may be 3D. The use of a confidence volume may be beneficial as it may facilitate more accurate localization of the target tag than a confidence area, especially when the height of the target tag and/or of the object corresponding to the object tag may vary.

In the tag detection stage, (at least part of the total number of) the plurality of listener nodes, especially a sensing subset of listener nodes (see below), may (be configured to) detect the target beacon signal and provide a related target signal to the control system. In particular, each listener node of the plurality of listener nodes may (independently) determine a signal property upon detecting the target beacon signal. Hence, after the target tag emits the target beacon signal, a subset of the listener nodes (also "sensing subset") may detect (or: "receive") the target beacon signal. Each of the listener nodes that detects the target beacon signal may then (independently) determine a signal property, wherein the signal property relates to the detection of the target beacon signal, especially wherein the signal property is derived from the (detection of the) target beacon signal. In embodiments, the signal property may be selected from the group comprising a signal strength, a signal quality, a distance estimate, an angle estimate and a phase estimate. In particular, the signal property may be related to a distance between the target tag and the (respective) listener node. For example, the signal strength may weaken as the beacon signal travels further from the target tag. Hence, if a listener node detects the beacon signal with a strong signal strength, the target tag may be close, whereas if the listener node detects the beacon signal with a weak signal strength, the target tag may be far, or an object may interfere with the detection of the beacon signal by the listener node. Similarly, the signal quality may also decrease as the beacon signal travels further from the target tag, or if an object interferes with the beacon signal as it travels to the listener node. In embodiments, the signal property may be selected from the group consisting of a signal strength, such as a Received Signal Strength Indicator (RSSI), a signal quality, a distance estimate, an angle estimate, and a phase estimate. In further embodiments, the signal property may comprise at least a signal strength, a signal quality, and/or a distance estimate. The term "signal property" may herein also refer to a plurality of signal properties.

The term "phase estimate" may herein refer to an estimate related to the carrier phase difference that a listener sees in a beacon signal it receives from a tag when the beacon signal comprises multiple carrier frequencies. The signal at each carrier frequency may result in a phase difference relative to the clock frequency of the listener. A phase estimate may be the total phase difference between the minimum carrier frequency and the maximum carrier frequency, or the phase difference averaged or normalized to a unit number of frequency band, e.g. 1 MHz.

The term "upon" may herein refer to while and/or after. Hence, the listener node may determine a signal property while and/or after detecting the target beacon signal. For example, the listener node may determine a signal strength of the target beacon signal (as detected) while detecting the target beacon signal, and may determine an estimated distance (directly) after detecting the target beacon signal.

The term "signal strength" may herein especially refer to the power present in the detected beacon signal. In particular, the signal strength may corresponding to a Received Signal Strength Indication (RSSI).

The term "signal quality" may herein especially refer to the quality of the detected tag beacon signal. In particular, the quality may, for example, be determined by comparing the detected target beacon signal to a (perfect) sigmoidal signal. The signal quality may be indicative of the how informative/trustworthy the signal is.

In embodiments, in the operational mode, especially in a listener node selection stage, the control system may (be configured to) determine a sensing subset of listener nodes of the plurality of listener nodes based on the confidence zone sets and/or based on historic information, especially based on the confidence zone sets, or especially based on the historic information.

For example, the control system may (be configured to) determine that a subset of listener nodes are (substantially) obstructed by the object and may be relatively uninformative for asset tracking, especially for (essentially) the entire space. Hence, rather than continuing to have these listener nodes report data and process these data (in view of the confidence zone sets), the control system may (be configured to) temporarily opt to use a sensing subset of (other) listener nodes for detecting the target beacon signal. In particular, in such embodiments, the confidence zone sets may have been taken into account for target tag location determination by pre-selecting the sensing subset of listener nodes.

Similarly, in embodiments, the control system may (be configured to) determine that a subset of listener nodes are relatively uninformative for asset tracking based on historic data. For example, the subset of listener nodes may have historically been inaccurate, or were previously determined to be uninformative when a specific object was in the space.

In further embodiments, in the operational mode, especially in the tag detection stage, the sensing subset of listener nodes may (be configured to) detect the target beacon signal and provide a related target signal to the control system.

In specific embodiments, in the operational mode, the control system may (be configured to) determine a sensing subset of listener nodes of the plurality of listener nodes based on the confidence zone sets; the sensing subset of listener nodes may (be configured to) detect the target beacon signal and provide a related target signal to the control system; and the control system may (be configured to) determine a target tag location (estimate) based on the related target signal, the listener location data, and the map data.

In embodiments, in the tag localization stage, the control system may (be configured to) determine a target tag location (estimate) of the target tag based on one or more of the related target signal, the listener location data, the map data, and the confidence zone sets of (the at least part of the total number of) the plurality of listener nodes, especially based on the related target signal, the listener location data, the map data, and the confidence zone sets of (the at least part of the total number of) the plurality of listener nodes. In further embodiments, the control system may (be configured to) determine a target tag location (estimate) of the target tag based on one or more of the related target signal, the listener location data, and the map data, (while) taking into account the confidence zone sets of (the at least part of the total number of) the plurality of listener nodes, especially based on the related target signal, the listener location data, and the map data, (while) taking into account the confidence zone sets of (the at least part of the total number of) the plurality of listener nodes.

Hence, the control system may (be configured to) determine the target tag location based on the related target signal, the listener location data, the map data, and the confidence zone sets. In particular, the control system may (be configured to) weigh the contribution of different listener nodes depending on the corresponding confidence zone sets. For example, if the target tag is estimated to be in a low confidence zone of a listener node, the data from such listener node may be weighed less than the data from other listener nodes when determining the target tag location.

In embodiments, if an object is determined to be present in the space the operational mode, especially the confidence zone determination stage, may comprise the control system (being configured to) determining an object location (estimate) of the object based on the related object signal. Hence, the control system may (be configured to) determine whether an object is present based on the related object signal, and may especially, if an object is deemed present, (be configured to) determine an object location (estimate) of the object based on the related object signal.

The phrase "if an object is determined to be present in the space . . . " and similar phrases may herein refer to a part of the operational mode wherein the control system checks whether an object is present in the space and, if so, performs the subsequently indicated action. In particular, the control system may determine that an object is present based on (input) information, or may determine that an object is present based on an object communication signal, especially an object beacon signal.

The term "object location" may herein especially refer to the area and/or the volume the object occupies. Hence, in embodiments, the object location may comprise a position of the object, but may in embodiments also comprise an orientation of the object. In further embodiments, the object location may comprise (a representation of) the area the object occupies. In further embodiments, the object location may comprise (a representation of) the volume the object occupies.

In further embodiments, the control system may (be configured to) determine a confidence zone set for each listener node further based on the object location. In particular, for each listener node the control system may (be configured to) divide the space into one or more confidence zones depending on the listener location data, the map data and the object location, i.e., the control system knows the location of the listener node (based on the listener location data), as well as the space the listener node can generally observe (based on the map data), and to what extent (a part of) the space is obstructed due to an object (based on the object location).

Determining the confidence zone set based on the object location may provide particularly good results.

In embodiments, the object location may comprise a boundary confidence interval for boundaries of the object. For example, if the control system has determined the location of the object with a resolution of a few cm, the control system may account for the uncertainty at boundaries of the object when determining the confidence zone set for each listener node, i.e., the control system may (be configured to) determine a confidence zone set for each listener node based on the listener location data, the map data, the object location, and the boundary confidence interval.

In embodiments, the boundary confidence interval may especially be based on the accuracy level of the asset-tracking system, especially of a positioning engine. Hence, the person skilled in the art will be capable of selecting a suitable boundary confidence interval depending on the hardware of the asset-tracking system. For example, in specific embodiments, the boundary confidence interval may be selected from the range of 5-30 cm, such as from the range of 15-25 cm.

In further embodiments, the control system may (be configured to) determine a confidence zone set for each listener node based on the listener location data, the map data, and the object location, (while) taking into account the boundary confidence interval.

In embodiments, in the operational mode, especially in the tag localization stage, the control system may (be configured to): determine a preliminary target tag location (estimate) of the target tag based on the related target signal, the listener location data, and the map data; provide a processed signal based on the related target signal, the preliminary target tag location, and the confidence zone sets, especially the confidence zone sets of (the at least part of the total number of) the plurality of listener nodes; and determine the target tag location based on the processed signal, the listener location data, and the map data. In further embodiments, the control system may (be configured to) provide a processed signal based on the related target signal and the preliminary target tag location, (while) taking into account the confidence zone sets.

Hence, the control system may (be configured to): first determine a preliminary target location based on the related target signal comprising data from the part of the listener nodes that detected the beacon signal and then provide a processed signal based on the preliminary target tag location with respect to the confidence zones in the confidence zone sets. In particular, if the preliminary target location falls in a low confidence zone of a listener node, the data from that listener node may be weighed lower or not incorporated into the processed signal. Thereby, the processed signal may be enriched in informative data with respect to the related target signal. Next, the control system may (be configured to) determine the target tag location based on the processed signal (rather than based (directly) on the related target signal), which may result in a more accurate localization of the tag.

In further embodiments, each confidence zone set may comprise a low confidence zone and/or a high confidence zone, and wherein in the operational mode, especially in the tag localization stage, the control system (is configured to) provides the processed signal from the related target signal by omitting data from the listener nodes for which the preliminary target tag location is in the (respective) low confidence zone.

The phrase "omitting data" may herein refer to the data not being included in the processed signal, such as by removing the data from the related target signal or such as by selectively including (other) data in the processed signal.

In further embodiments, each confidence zone set may comprise a partitioning of the space into one or more confidence zones with associated confidence scores, especially associated confidence score ranges, and wherein in the operational mode, especially in the tag localization stage, the control system may (be configured to) provide the processed signal from the related target signal by weighing data from the listener nodes on the basis of the (respective) confidence scores associated to the respective confidence zones (of the listener nodes) comprising the preliminary target tag location. Hence, the data of each listener node may be weighed according to the confidence score of the respective confidence zone in which the preliminary target location lies.

For example, data of a listener node for which the preliminary target location lies in a low confidence zone may receive a small weight, whereas data of a listener node for which the preliminary target location lies in a medium confidence zone may receive a medium weight, while data of a listener node for which the preliminary target location lies in a high confidence zone may receive a high weight. It will be clear to the person skilled in the art that the more weight is assigned to the data of a listener node, the more impact the respective data may have on the determination of the target tag location.

In embodiments, the control system may (be configured to) determine the confidence zone sets based on predefined confidence scores, especially predefined confidence score ranges, such as n predefined confidence scores, especially n predefined confidence score ranges, wherein n may be at least 2, such as at least 3. In further embodiments, n may be selected from the range of 3-20, such as from the range of 3-10.

Hence, in embodiments, in the operational mode, the control system may (be configured to) for each listener node of the plurality of listener nodes partition the space into one or more confidence zones with associated confidence scores based on one or more of the related object signal, the listener location data and the map data. In further embodiments, the control system may (be configured to) for each listener node of the plurality of listener nodes partition the space into one or more confidence zones with associated confidence scores based on one or more of the object location, the listener location data and the map data. In further embodiments, the control system may (be configured to) for each listener node of the plurality of listener nodes partition the space into one or more confidence zones with associated confidence scores based at least partially on one or more object properties of the object, wherein the object properties are selected from the group comprising a shape and a material. For example, the control system may (be configured to) take into account the spatial variation in thickness and/or material of the object when determining the confidence zones.

In embodiments, each confidence zone set may comprise a confidence volume set (or "3D confidence set"). The term "confidence volume set" may refer to a confidence zone set comprising confidence zones comprising confidence volumes (see above).

In further embodiments, each confidence zone set may comprise a confidence area set (or "2D confidence set"). The term "confidence area set" may refer to a confidence zone set comprising confidence zones comprising confidence areas (see above).

The asset-tracking system may especially be integrated into other (pre-existing) infrastructure. In particular, in embodiments, the listener nodes may be integrated in lighting devices. Lighting devices may be equipped with low-bandwidth wireless communication devices for controlling the lighting devices. For example, a light generating device may comprise or be functionally coupled to a wireless communication device such that the light generating device can be controlled remotely. Hence, in embodiments, the wireless communication device may comprise a listener node.

The term "lighting device" may herein, for example, refer to one or more of a light generating device, a light control element, such as a light switch, and an (occupancy) sensor.

In further embodiments, the asset-tracking system may comprise a plurality of lighting devices, wherein (at least part of) the plurality of listener nodes are integrated in the lighting devices.

In embodiments, at least 50% of a total number of the plurality of listener nodes may be arranged in a regular grid, such as in a regular grid of lighting devices. The term "regular grid" may herein especially refer to a pattern formed by intersections of two or more sets of regularly spaced parallel lines, especially wherein listener nodes are arranged at the intersections.

In further embodiments, the listener nodes comprised by the regular grid may be arranged at (essentially) the same height, such as on the ceiling.

In further embodiments, the plurality of listener nodes, may further comprise one or more listener nodes which are not comprised by the regular grid and which are configured at a different height than the listener nodes configured in the regular grid. In general, in embodiments, the target tag (or the object tag) may periodically independently emit the target beacon signal (object beacon signal), i.e., the target tag (the object tag) may be configured to emit the target beacon signal (object beacon signal) in a regular (or irregular) interval.

However, in embodiments, the control system may (be configured to) (have a signal generating element) emit a tracking signal, wherein the target tag (or object tag) emits the target beacon signal (or object beacon signal) upon detecting the tracking signal. In such embodiments, the control system may (be enabled to) locate the target tag (or object tag) at any moment, which may be beneficial if the location of the target tag (or object tag) may need to be determined at short notice, such as, for example, to quickly locate a specialist in a hospital or in a factory.

Phrases like "in the operational mode, the control system may determine a target tag location", or "in the operational mode, the control system may determine a confidence zone set", or "in the operational mode, the control system executes a (step of a) method", or "in the operational mode, the control system may execute a method", and similar phrases, may also in embodiments be read that the control system is configured to perform the indicated action (in an operational mode), such as configured to determine a target tag location in an operational mode, or configured to execute a (step of a) method in an operational mode.

In embodiments, the asset-tracking system, especially the control system, may be configured to execute the method of the invention (see below).

In a second aspect, the invention may further provide a method for localizing an (emission) location of a target beacon signal in a space, especially wherein a plurality of listener nodes are arranged in the space. In embodiments, the method may be for localizing, especially tracking, a target tag in a space. In embodiments, the method may comprise one or more of an object detection stage, a confidence zone determination stage, a (tag) detection stage, and a (tag) localization stage.

The object detection stage may comprise determining, by a control system according to the invention, the presence of an object (in the space). In embodiments, an object tag may be arranged on the object. In embodiments, the object tag and the plurality of listener nodes may (be configured to) communicate via an object communication signal and to provide a related object signal. Hence, the method, especially the object detection stage, may comprise transmitting an object communication signal between the object tag and the plurality of listener nodes and providing a related object signal.

The confidence zone determination stage may comprise determining, by a control system according to the invention, a confidence zone set for each listener node based on the related object signal, map data (of the space), and listener location data (of the plurality of listener nodes).

In embodiments, the (tag) detection stage may comprise transmitting a target communication signal between the target tag and the plurality of listener nodes, or alternatively phrased from the target tag to the plurality of listener nodes, and providing a related target signal, by the plurality of listener nodes to the control system according to the invention. Hence, the target tag and the plurality of listener nodes may (be configured to) communicate via a target communication signal and to provide a related target signal.

The (tag) detection stage may comprise detecting the target beacon signal with (at least part of a total number of) the plurality of listener nodes and providing a related target signal.

The (tag) localization stage may comprise determining, by a control system according to the invention, the location based on the related target signal, the listener location data, the map data, and the confidence zone sets of (the at least part of the total number of) the plurality of listener nodes.

In embodiments, the target tag (is configured to) emit a beacon signal. In particular, the listener nodes may (be configured to) detect the target beacon signal.

In further embodiments, the object tag (is configured to) emit an object beacon signal, especially the object tag (is configured to) periodically emit the object beacon signal. In embodiments, the plurality of listener nodes may be configured to detect the object beacon signal and especially to provide a related object signal.

In embodiments, the plurality of listener nodes may be configured to emit a listener node signal. In further embodiments, the target tag may be configured to detect the listener node signal. In further embodiments, the object tag may be configured to detect the listener node signal.

In embodiments, the (tag) detection stage may comprise detecting the target beacon signal with (at least part of a total number of) the plurality of listener nodes and providing a related target signal.

Hence, in specific embodiments, the invention provides a method for localizing a location of a target beacon signal in a space, wherein a plurality of listener nodes are arranged in the space, wherein the listener nodes are configured to detect the target beacon signal, wherein the method comprises: (a) determining the presence of an object, wherein an object tag is arranged on the object, and wherein the object tag periodically emits an object beacon signal, wherein the plurality of listener nodes are configured to detect the object beacon signal and to provide a related object signal: (b) determining a confidence zone set for each listener node based on the related object signal, map data, and listener location data; (c) detecting the target beacon signal with the plurality of listener nodes and providing a related target signal; and (d) determining the location based on the related target signal, the listener location data, the map data, and the confidence zone sets of (the at least part of the total number of) the plurality of listener nodes.

The phrase "method for localizing a location of a target beacon signal", and similar phrases, may also in embodiments be interpreted as a method for localizing a location of a tag (that emits the beacon signal).

In embodiments, if an object is determined to be present in the space, the method, especially the object detection stage, may comprise determining an object location (estimate) of the object based on the related object signal. In further embodiments, the method, especially the confidence zone determination stage, may comprise determining the confidence zone set for each listener node further based on the object location.

In embodiments, the method, especially the (tag) localization stage, may comprise determining a preliminary location (estimate), i.e. of the target tag, based on the related target signal, the listener location data, and the map data. In further embodiments, the method, especially the (tag) localization stage, may comprise providing a processed signal based on the related target signal, the preliminary location (of the target tag), and the confidence zone sets (of at least part of the total number of) the plurality of listener nodes. In such embodiments, the method, especially the (tag) localization stage, may further comprise determining the location based on the processed signal, the listener location data, and the map data.

In embodiments, each confidence zone set may comprise a low confidence zone and/or a high confidence zone, i.e., a confidence zone set may comprise a single high (or low) confidence zone, or may comprise a low confidence zone and a high confidence zone.

In further embodiments, the method, especially the (tag) localization stage, may comprise providing the processed signal from the related target signal by omitting data from the listener nodes for which the preliminary location is in the (respective) low confidence zone.

In embodiments, each confidence zone set may comprise a partitioning of the space into one or more confidence zones with associated confidence scores. In such embodiments, the method may comprise providing the processed signal from the related target signal by weighing data from the listener nodes on the basis of the (respective) confidence scores associated to the respective confidence zones (of the listener nodes) comprising the preliminary location.

In embodiments, at least 50% of a total number of the plurality of listener nodes may be arranged in a regular grid, especially wherein one or more listener nodes, especially "off-grid listener noes", which are not comprised by the regular grid are configured at a different height than the listener nodes configured in the regular grid. Hence, the plurality of listener nodes may comprise one or more off-grid listener nodes. In a further aspect, the invention may provide a computer program product comprising instructions for execution on a computer functionally coupled to a plurality of listener nodes, wherein the instructions, when executed by the computer, cause the computer to carry out at least part of the steps of the method of the invention.

In embodiments, the computer program product may be executable by a computer functionally coupled to an asset-tracking system to have the asset-tracking system carry out at least part of the steps of the method of the invention.

In a further aspect, the invention may provide a data carrier, carrying thereupon program instructions which, when executed by a computer functionally coupled to a plurality of listener nodes, cause the computer to carry out at least part of the steps of the method of the invention.

In a further aspect, the invention may provide a lighting device comprising at least one of the listener nodes as defined herein for use in the asset-tracking system as defined herein. In specific embodiments, the (above described) method for localizing an (emission) location of a beacon signal (of a tag) in a space may use such lighting device.

In embodiments, the lighting device may comprise a light generating device, a light control element, or a (proximity) sensor, especially a light generating device, more especially a luminaire.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, etc..

In a specific embodiment, the light source comprises a solid state LED light source (such as a LED or laser diode).

The term "light source" may also relate to a plurality of light sources, such as 2-20 (solid state) LED light sources. Hence, the term LED may also refer to a plurality of LEDs.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
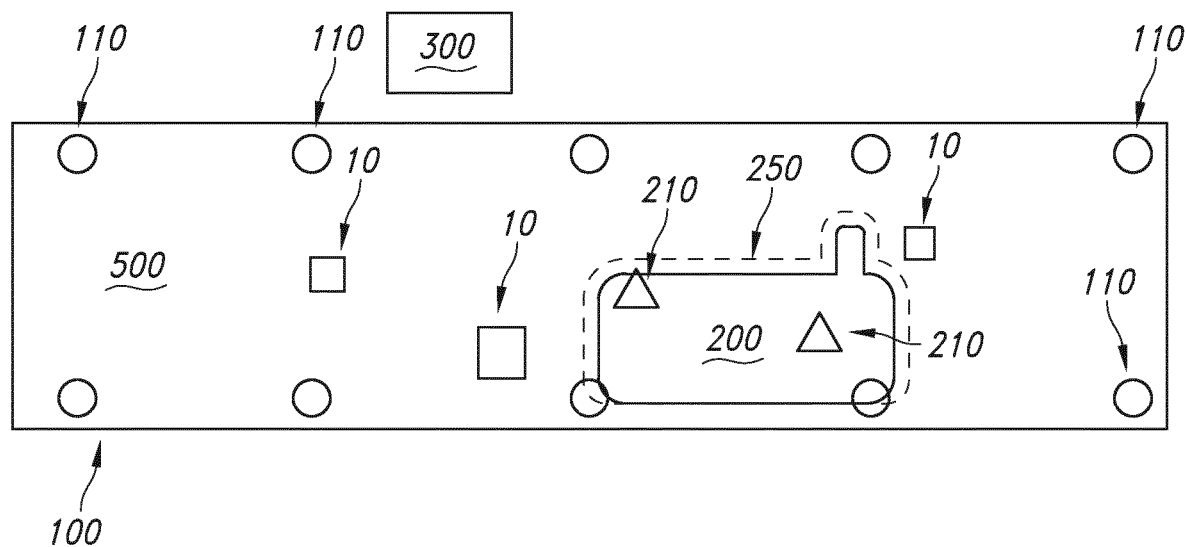
FIG. 1A-B schematically depict an embodiment of the asset-tracking system.
Figure 1B:
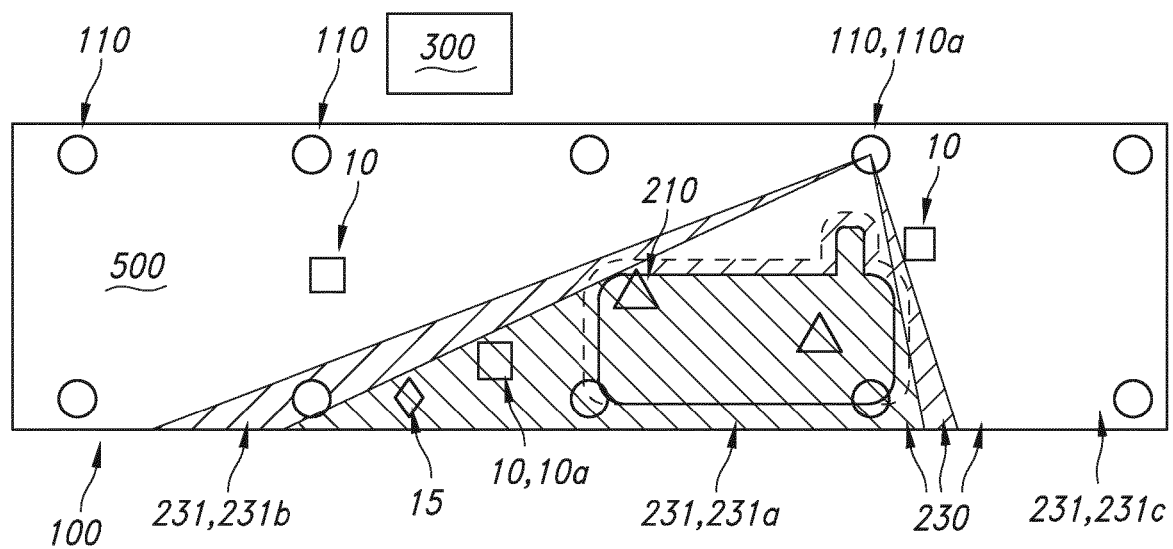

FIG. 1A-B schematically depict an embodiment of the asset-tracking system 100 for tracking a target tag 10 in a space 500. The asset-tracking system 100 may comprise a plurality of listener nodes 110 arranged in the space 500. The asset-tracking system 100 may comprise a control system 300, especially wherein the control system 300 has access to one or more of listener location data and map data. In embodiments, the asset-tracking system may have an operational mode, wherein:

the control system 300 may (be configured to) determine the presence of an object 200, wherein an object tag 210 is associated to the object 200. In embodiments, the object tag 210 and the plurality of listener nodes 110 are configured to communicate via an object communication signal and to provide a related object signal to the control system 300. In further embodiments, the object tag 210 may be configured to emit an object beacon signal, wherein the plurality of listener nodes 110 are configured to detect the object beacon signal and to provide a related object signal to the control system 300;

the control system 300 may determine a confidence zone set 230 for each listener node 110 based on the related object signal, the listener location data and the map data;

the plurality of listener nodes 110 and a target tag 10 may (be configured to) communicate via a target communication signal and to provide a related target signal to the control system 300. In embodiments, the target tag may (be configured to) emit a target beacon signal, especially wherein the plurality of listener nodes 110 may (be configured to) detect the target beacon signal and to provide a related target signal to the control system 300; and the control system 300 may determine a target tag location of the target tag 10 based on the related target signal, the listener location data, the map data, and the confidence zone sets 230 of the plurality of listener nodes 110.

FIG. 1A schematically depicts two object tags 210 being associated to the object 200.

In embodiments, if an object 200 is determined to be present in the space 500 the operational mode may comprise the control system 300 (being configured to) determining an object location 250 of the object 200 based on the related object signal. In the depicted embodiment, the object location 250 may comprise a boundary confidence interval for boundaries of the object 200. Hence, the object location 250 be a larger space than the object 200 itself to account for uncertainties in the object location 250.

In further embodiments, the control system 300 may (be configured to) determine the confidence zone set 230 for each listener node 110 based on the listener location data, the map data, and the object location 250.

FIG. 1B schematically depicts the same embodiment as FIG. 1A and depicts the confidence zones 231 of a confidence zone set 230 for a first listener node 110,110a. In particular, FIG. 1B schematically depicts the space being divided into three confidence zones 231,231a,231b,231c for the first listener node 110,110a based on the object location 250. Specifically, a first confidence zone 231,231a may be a low confidence zone, wherein the first confidence zone comprises the zone that is estimated to be directly blocked by the object 200 at the object location 250. The second confidence zone 231,231b may be a medium confidence zone, wherein the second confidence zone 231, 231b comprises the zone that may be blocked (with respect to the first listener node 110,110) by the object 200 due to some uncertainty in the object location 250. The third confidence zone 231,231c may be a high confidence zone, wherein the third confidence zone may comprise the zone that is considered to be unobstructed by the object 200 (with respect to the first listener node 110, 110a) based on the object location 250.

In embodiments, in the operational mode: the control system 300 may determine a preliminary target tag location 15 of the target tag 10 based on the related target signal, the listener location data, and the map data. Next, the control system 300 may provide a processed signal based on the related target signal, the preliminary target tag location 15, and the confidence zone sets 230 of the plurality of listener nodes 110. For example, in the depicted embodiment, the control system 300 may determine that the preliminary target tag location 15 lies in the first confidence zone 231,231a of the confidence zone set 230 of the first listener node 110, wherein the first confidence zone 231,231 is a low confidence zone. Hence, the control system 300 may provide the processed signal by (optionally among other modifications) providing a lower weight to or omitting the data of the first listener node 110,110a. Then, the control system 300 may determine the target tag location based on the processed signal, the listener location data, and the map data. As the data from obstructed listener node(s) 110 may be weighed less and/or omitted, the estimated target tag location may be more accurate than the preliminary target tag location (estimate) 15.

In further embodiments, each confidence zone set 230 may comprise a partitioning of the space 500 into one or more confidence zones 231 with associated confidence scores, and wherein in the operational mode the control system 300 may provide the processed signal from the related target signal by weighing data from the listener nodes 110 on the basis of the confidence scores associated to the respective confidence zones 231 comprising the preliminary target tag location 15. In the depicted embodiment, with regards to the first listener node 110,110, the confidence zone set 230 may comprise three confidence zones 231. In embodiments, different listener nodes 110 (of the plurality of listener nodes 110) may differ in the number of confidence zones 231 in their respective confidence sets 230.

FIG. 1A-B further schematically depict an embodiment of the method for localizing an (emission) location of a target beacon signal, especially the target tag location, in a space 500, especially for tracking a target tag 10 in the space 500. In particular, a plurality of listener nodes 110 may be arranged in the space 500. In embodiments, the method may comprise: determining the presence of an object 200, wherein an object tag 210 is arranged on the object 200. In particular, the object tag 210 and the plurality of listener nodes 110 may be configured to communicate via an object communication signal and to provide a related object signal. In particular, in embodiments, the object tag 210 may be configured to emit an object beacon signal, wherein the plurality of listener nodes 110 are configured to detect the object beacon signal and to provide the related object signal; determining a confidence zone set 230 for each listener node 110 based on the related object signal, map data, and listener location data; transmitting a target communication signal between the target tag 10 and the plurality of listener nodes 110 and providing a related target signal. In particular, in embodiments, the target tag 10 may be configured to emit a target beacon signal and the method may comprise detecting the target beacon signal with the plurality of listener nodes 110 and providing a related target signal; and determining the location based on the related target signal, the listener location data, the map data, and the confidence zone sets 230 of the plurality of listener nodes 110.

FIG. 1B further schematically depicts an embodiment of the method wherein if an object 200 is determined to be present in the space 500 the method comprises: determining an object location 250 of the object 200 based on the related object signal; and determining the confidence zone set 230 for each listener node 110 based on the listener location data, the map data, and the object location 250.

In the depicted embodiment, the method further comprises: determining a preliminary location, especially a preliminary target tag location 15, based on the related target signal, the listener location data, and the map data; providing a processed signal based on the related target signal, the preliminary location, and the confidence zone sets 230 of the plurality of listener nodes 110; and determining the location based on the processed signal, the listener location data, and the map data.

In the depicted embodiment, the method may comprise partitioning the space 500 into one or more confidence zones 231 with associated confidence scores, and especially providing the processed signal from the related target signal by weighing data from the listener nodes 110 on the basis of the confidence scores associated to the respective confidence zones 231 comprising the preliminary location, especially the preliminary target tag location 15.

Figure 2:
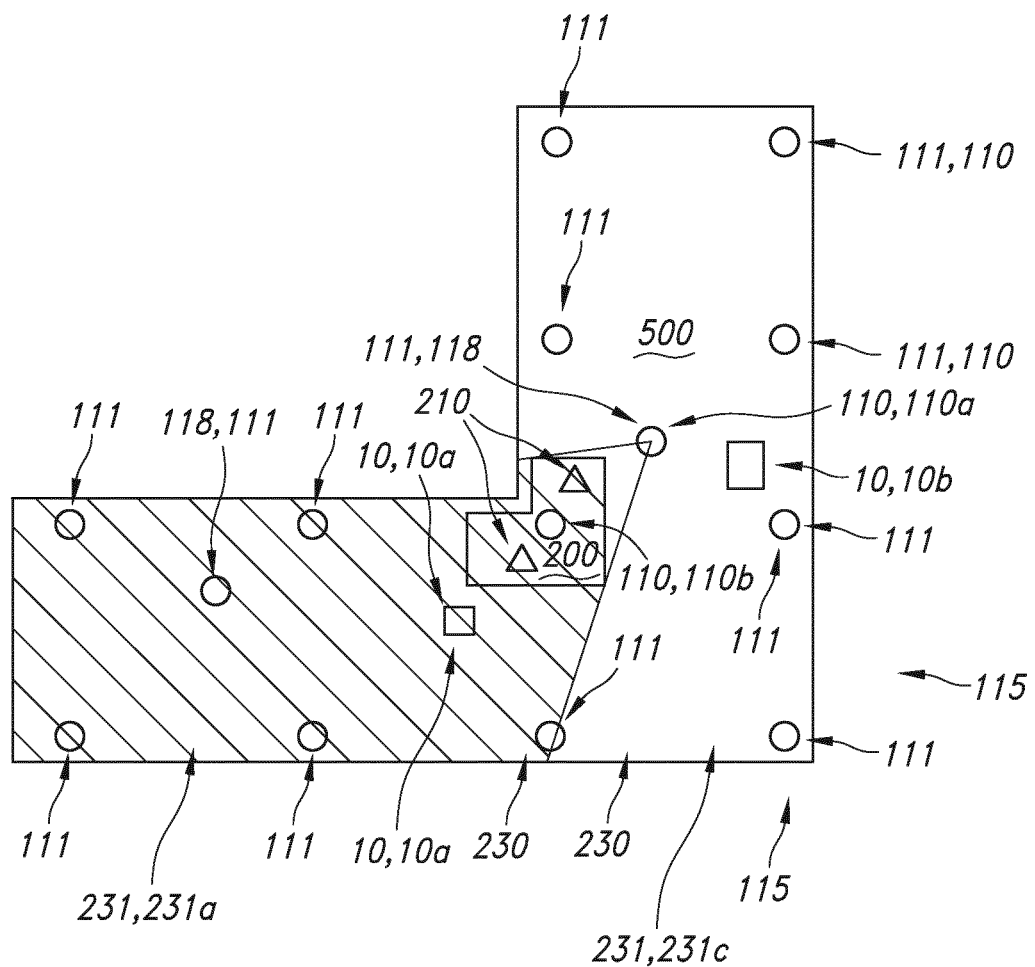
FIG. 2 schematically depicts a further embodiment of the asset-tracking system.

FIG. 2 schematically depicts a further embodiment of the asset-tracking system 100. In the depicted embodiment, the confidence zone sets 230 of the first listener node 110,110a may account for both the object 200 as of a wall in the space (500).

In the depicted embodiment, a second listener node 110, 110b may essentially be fully blocked (with regards to field of view) by the object 200. Hence, in the operational mode the control system 300 may determine a sensing subset of listener nodes 111 of the plurality of listener nodes 110 based on the confidence zone sets 230. In particular, the second listener node 110,110b may be left out of the sensing subset of listener nodes 111. In further embodiments, the sensing subset of listener nodes 111 may detect the target beacon signal and provide a related target signal to the control system 300, especially, the control system 300 may deactivate the detection of the listener nodes 110 that were excluded from the sensing subset of listener nodes 111.

In the depicted embodiment, each confidence zone set 230 may comprise a low confidence zone and/or a high confidence zone, and wherein in the operational mode: the control system 300 may provide the processed signal from the related target signal by omitting data from the listener nodes 110 for which the preliminary target tag location 15 is in the low confidence zone. Hence, in the depicted embodiment, the data from the first listener node 110,110a may likely (dependent on the preliminary target tag locations 15) be omitted with regards to the localization of a first target tag 10,10a, but may be included in the processed signal with regards to the localization of a second target tag 10,10b.

FIG. 2 further schematically depicts an embodiment wherein at least 50% of a total number of the plurality of listener nodes 110 are arranged in a regular grid 115, and wherein the plurality of listener nodes 110 further comprise one or more listener nodes 110, especially off-grid listener nodes 118, which are not comprised by the regular grid 115 and which are especially configured at a different height than the listener nodes 110 comprised by the regular grid 115.

FIG. 2 further schematically depicts an embodiment of the method of the invention, wherein each confidence zone set 230 comprises a low confidence zone and/or a high confidence zone, and wherein the method comprises providing the processed signal from the related target signal by omitting data from the listener nodes 110 for which the preliminary location is in the low confidence zone.

Figure 3:
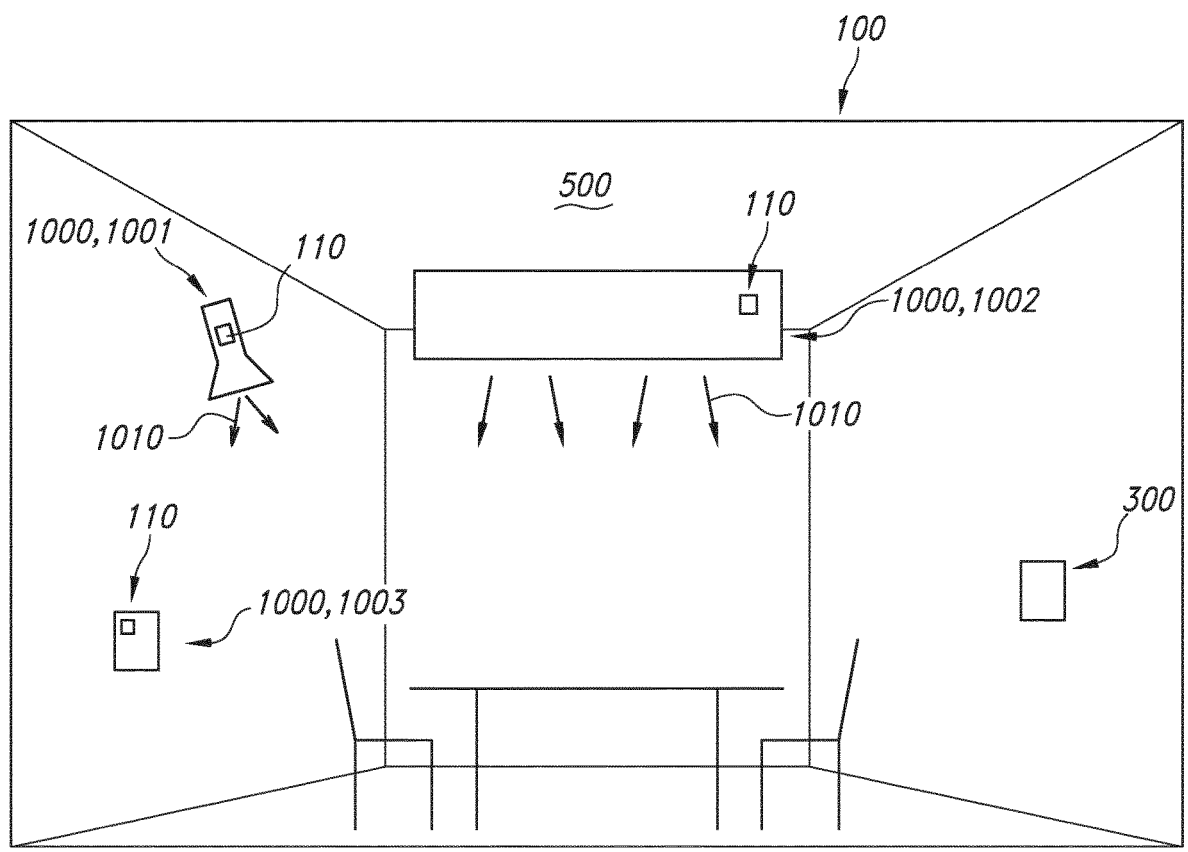
FIG. 3 schematically depicts a further embodiment of the asset-tracking system.

FIG. 3 schematically depicts another embodiment of the asset-tracking system 100, wherein (at least part of a total number of) the plurality of listener nodes 110 are integrated in lighting devices 1000. In particular, FIG. 3 schematically depicts lighting devices 1000 comprising light generating devices, such as a lamp 1001, and a luminaire 1002, and a lighting control element 1003, such as a user interface, like a graphical user interface. Reference 1010 indicates the light that is generated by a lighting device 1000. Especially, this light is visible light, such as white light. The lighting control element 1003 may also be a portable device, such as an I-phone or Smartphone.

FIG. 3 also schematically depicts an embodiment of the lighting device 1000, wherein the lighting device 1000 comprises at least one of the listener nodes 110 of the invention for use in the asset-tracking system 100 of the invention.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The term "controlling" and similar terms herein especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc.. Beyond that, the term "controlling" and similar terms may additionally include monitoring. Hence, the term "controlling" and similar terms may include imposing behavior on an element and also imposing behavior on an element and monitoring the element. The controlling of the element can be done with a control system. The control system and the element may thus at least temporarily, or permanently, functionally be coupled. The element may comprise the control system. In embodiments, the control system and the element may not be physically coupled. Control can be done via wired and/or wireless control. The term "control system" may also refer to a plurality of different control systems, which especially are functionally coupled, and of which e.g. one control system may be a control system and one or more others may be slave control systems.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Amongst others, the invention involves a collaborative system and may include at least two steps. In a first step, listeners near a transmitting tag, are informing and negotiating among themselves. Further, top listeners may be selected in a distributed manner based on the measurement they have individually. In a second step, the measurement results of all the selected listeners are sent individually by the selected listeners or sent by one or more reporting listeners that can be selected already in the first step. The destination of the reports may be the gateway for the network.

The invention claimed is:

1. An asset-tracking system for tracking a target tag in a space, wherein the asset-tracking system comprises a plurality of listener nodes arranged in the space, and wherein the asset-tracking system comprises a control system, wherein the control system has access to (i) listener location data and to (ii) map data, characterized in that in an operational mode:
the control system is configured to determine the presence of an object, wherein an object tag is associated to the object, and wherein the object tag and the plurality of listener nodes are configured to communicate via an object communication signal and to provide a related object signal to the control system;
the control system determines a confidence zone set for each listener node based on the related object signal, the listener location data and the map data;
the target tag and the plurality of listener nodes are configured to communicate via a target communication signal and to provide a related target signal to the control system; and
the control system determines a target tag location of the target tag based on the related target signal, the listener location data, the map data, and the confidence zone sets of the plurality of listener nodes.

2. The asset-tracking system according to claim 1, wherein the target tag is configured to emit a target beacon signal, and wherein the object tag is configured to emit an object beacon signal, and wherein in the operational mode:
the plurality of listener nodes are configured to detect the object beacon signal and to provide a related object signal to the control system; and
the plurality of listener nodes are configured to detect the target beacon signal and to provide a related target signal to the control system.

3. The asset-tracking system according to claim 1, wherein if an object is determined to be present in the space, in the operational mode:
the control system is configured to determine an object location of the object based on the related object signal; and
the control system is configured to determine the confidence zone set for each listener node is further based on the object location.

4. The asset-tracking system according to claim 1, wherein in the operational mode:
the control system is configured to determine a sensing subset of listener nodes of the plurality of listener nodes based on the confidence zone sets; and the sensing subset of listener nodes is configured to detect the target beacon signal and to provide a related target signal to the control system.

5. The asset-tracking system according to claim 1, wherein in the operational mode:
the control system; is configured to determine a preliminary target tag location of the target tag based on the related target signal, the listener location data, and the map data;
the control system is configured to provide a processed signal based on the related target signal, the preliminary target tag location, and the confidence zone sets of the plurality of listener nodes;
the control system is configured to determine the target tag location based on the processed signal, the listener location data, and the map data.

6. The asset-tracking system according to claim 5, wherein each confidence zone set comprises a low confidence zone and/or a high confidence zone, and wherein in the operational mode:
the control system is configured to provide the processed signal from the related target signal by omitting data from the listener nodes for which the preliminary target tag location is in the low confidence zone.

7. The asset-tracking system according to claim 6, wherein each confidence zone set comprises a partitioning of the space into one or more confidence zones with associated confidence scores, and wherein in the operational mode:
the control system is configured to provide the processed signal from the related target signal by weighing data from the listener nodes on the basis of the confidence scores associated to the respective confidence zones comprising the preliminary target tag location.

8. The asset-tracking system according to claim 1, wherein at least part of a total number of the plurality of listener nodes are integrated in lighting devices, and wherein at least 50% of a total number of the plurality of listener nodes are arranged in a regular grid.

9. A method for tracking a target tag in a space, wherein a plurality of listener nodes are arranged in the space, wherein the method comprises:
determining, by a control system, the presence of an object, wherein an object tag is arranged on the object, and wherein the object tag and the plurality of listener nodes are configured to communicate via an object communication signal and the plurality of listener nodes provide a related object signal to the control system;
determining, by a control system, a confidence zone set for each listener node based on the related object signal, map data, and listener location data;
transmitting a target communication signal from the target tag to the plurality of listener nodes and providing a related target signal by the plurality of listener nodes to the control system; and
determining, by a control system, the location of the target tag based on the related target signal, the listener location data, the map data, and the confidence zone sets of the plurality of listener nodes.

10. The method according to claim 9, wherein the target tag is configured to emit a target beacon signal, and wherein the object tag is configured to emit an object beacon signal, and wherein the method comprises:
detecting the object beacon signal with the plurality of listener nodes and providing the related object signal; and
detecting the target beacon signal with the plurality of listener nodes and providing the related target signal.

11. The method according to claim 9, wherein if an object is determined to be present in the space the method comprises:
determining an object location of the object based on the related object signal; and
determining the confidence zone set for each listener node further based on the object location.

12. The method according to claim 9, wherein the method comprises:
determining a preliminary location of the target tag based on the related target signal, the listener location data, and the map data;
providing a processed signal based on the related target signal, the preliminary location, and the confidence zone sets of the plurality of listener nodes; and
determining the location of the target tag based on the processed signal, the listener location data, and the map data.

13. The method according to claim 12, wherein each confidence zone set comprises a partitioning of the space into one or more confidence zones with associated confidence scores, and wherein the method comprises:
providing the processed signal from the related target signal by weighing data from the listener nodes on the basis of the confidence scores associated to the respective confidence zones comprising the preliminary location.

14. The method according to claim 9, wherein at least 50% of a total number of the plurality of listener nodes are arranged in a regular grid, and wherein the plurality of listener nodes comprises one or more off-grid listener nodes which are not comprised by the regular grid and are configured at a different height than the listener nodes configured in the regular grid, and wherein at least part of a total number of the plurality of listener nodes are integrated in lighting devices.

* * * * *